United States Patent
Yoo et al.

(10) Patent No.: US 9,534,143 B2
(45) Date of Patent: Jan. 3, 2017

(54) COATED STEEL SHEET HAVING SUPERIOR WELDING, SCRATCH-RESISTANCE, AND CORROSION-RESISTANCE PROPERTIES

(71) Applicant: POSCO, Pohang-si (KR)

(72) Inventors: Hye Jin Yoo, Busan (KR); Jin Ho Jung, Gwangyang-si (KR); Jung Su Kim, Gwangyang-si (KR); Bong Woo Ha, Gwangyang-si (KR); Chang Se Byeon, Gwangyang-si (KR); Jung Hwan Lee, Gwangyang-si (KR); Jong-Sang Kim, Gwangyang-si (KR); Jin Tae Kim, Gwangyang-si (KR)

(73) Assignee: POSCO, Pohang-si (KR)

( * ) Notice: Subject to any disclaimer, the term of this patent is extended or adjusted under 35 U.S.C. 154(b) by 352 days.

(21) Appl. No.: 14/353,948

(22) PCT Filed: Oct. 25, 2012

(86) PCT No.: PCT/KR2012/008803
§ 371 (c)(1),
(2) Date: Apr. 24, 2014

(87) PCT Pub. No.: WO2013/062329
PCT Pub. Date: May 2, 2013

(65) Prior Publication Data
US 2014/0302311 A1  Oct. 9, 2014

(30) Foreign Application Priority Data
Oct. 25, 2011  (KR) .................. 10-2011-0109407

(51) Int. Cl.
*B32B 15/08* (2006.01)
*C09D 175/12* (2006.01)
(Continued)

(52) U.S. Cl.
CPC .............. *C09D 175/12* (2013.01); *C09D 5/10* (2013.01); *C09D 5/103* (2013.01); *C09D 5/106* (2013.01);
(Continued)

(58) Field of Classification Search
CPC ....................................... C08G 59/00
See application file for complete search history.

(56) References Cited

U.S. PATENT DOCUMENTS 4,220,675 A * 9/1980 Imazaki ................ B05D 5/068
427/195
4,970,126 A * 11/1990 Adaniya ................. B05D 7/51
428/623
(Continued)

FOREIGN PATENT DOCUMENTS

CN   101158810 A   4/2008
EP   0545605 A2   11/1992
(Continued)

*Primary Examiner* — Gregory Webb
(74) *Attorney, Agent, or Firm* — The Webb Law Firm

(57) ABSTRACT

Provided is a resin composition for an under coat of an UV coating layer and a coated steel sheet using the resin composition. The coated steel sheet comprises a material steel sheet; an under coat layer including a cured product of a resin composition for the under coat layer which contains a main resin and a metal powder, the under coat layer being formed on one side or both sides of the material steel sheet; and a top coat layer formed on the under coat layer and containing a radical compound, thereby providing a superior appearance, scratch resistance, corrosion resistance and superior weldability.

8 Claims, 1 Drawing Sheet

(51) Int. Cl.
  *C23C 26/00* (2006.01)
  *C23C 28/00* (2006.01)
  *C09D 5/10* (2006.01)
  *C08K 3/08* (2006.01)

(52) U.S. Cl.
  CPC .............. *C23C 26/00* (2013.01); *C23C 28/00* (2013.01); *C08K 3/08* (2013.01); *C08K 2003/0812* (2013.01); *C08K 2003/0893* (2013.01); *Y10T 428/265* (2015.01); *Y10T 428/31576* (2015.04)

(56) References Cited

U.S. PATENT DOCUMENTS

| | | | | |
|---|---|---|---|---|
| 6,015,628 A | * | 1/2000 | Urata | B05D 7/51 |
| | | | | 428/413 |
| 6,361,872 B1 | * | 3/2002 | Hosono | C08G 18/4676 |
| | | | | 106/14.13 |
| 6,852,771 B2 | * | 2/2005 | Balch | B05D 3/0209 |
| | | | | 427/496 |
| 2003/0207956 A1 | * | 11/2003 | Balch | B05D 3/0209 |
| | | | | 522/104 |
| 2004/0115438 A1 | * | 6/2004 | Gros | C09D 175/16 |
| | | | | 428/422.8 |
| 2005/0085565 A1 | | 4/2005 | Hintze-Bruning et al. | |
| 2008/0026157 A1 | * | 1/2008 | Jung | B05D 7/16 |
| | | | | 427/409 |
| 2009/0155598 A1 | | 6/2009 | Bierwagen et al. | |
| 2012/0263966 A1 | | 10/2012 | Jung et al. | |

FOREIGN PATENT DOCUMENTS

| | | |
|---|---|---|
| EP | 2377901 A2 | 10/2011 |
| EP | 2518183 A2 | 10/2012 |
| EP | 2535384 A2 | 12/2012 |
| JP | 1993-009407 | 1/1993 |
| JP | 2000-351937 A | 12/2000 |
| JP | 2006-150261 | 6/2006 |
| KR | 1003960840000 | 11/1999 |
| KR | 1007429040000 | 7/2007 |
| KR | 1010368290000 | 5/2011 |
| KR | 10-2011-0073099 | 6/2011 |
| KR | 1011160380000 | 2/2012 |
| WO | 2011/078497 A2 | 6/2011 |
| WO | 2011/099709 A2 | 8/2011 |

* cited by examiner

COATED STEEL SHEET HAVING SUPERIOR WELDING, SCRATCH-RESISTANCE, AND CORROSION-RESISTANCE PROPERTIES

CROSS-REFERENCE TO RELATED APPLICATIONS

This application is the United States national phase of International Application No. PCT/KR2012/008803 filed Oct. 25, 2012, and claims priority to Korean Patent Application No. 10-2011-0109407 filed Oct. 25, 2011, the disclosures of which are hereby incorporated in their entirety by reference.

TECHNICAL FIELD

The present invention relates t a coated steel sheet having superior weldability, scratch-resistance, and corrosion-resistance properties.

BACKGROUND ART

In general, a conventional weldable coated steel sheet is a steel sheet manufactured by coating organic solvent type resin containing metal powder, and aqueous chrome-free treatment must be applied to the steel sheet in order to secure adhesion with the steel sheet and corrosion resistance. The chrome-free coating formed on the steel sheet is less than 1 μm thick, but cannot contain conductive pigments such as metal powder, conductive ceramic, graphene and so on, in order to secure corrosion resistance, and hence, is deteriorated in weldability.

In the meantime, a coated steel sheet for shielding electromagnetic waves in order to enhance conductivity of a surface-coated layer is manufactured when aqueous paint composition containing metal powder is coated on the steel sheet. Such an aqueous paint composition containing metal powder is superior in adhesion with the steel sheet, but is vulnerable to corrosion resistance, thus it is difficult to be utilized as a steel sheet for construction materials which require high-degree corrosion resistance.

A surface coated steel sheet which is coated with UV-curing paint composition has superior appearance and scratch-resistance, but is difficult to be welded because a thick surface-coated layer is formed on the surface of the steel sheet. Particularly, because a curing reaction of the UV-curing paint composition occurs by irradiation of ultraviolet rays, it is difficult to use opaque metal powder or pigments into the UV-curing paint composition.

Therefore, in order to use the surface coated steel sheet coated with the UV-curing paint composition, which has superior appearance and scratch-resistance, in the field of the construction field, it is necessary to develop a coated steel sheet which enhance coating adhesion with the steel sheet, secure corrosion resistance and has superior weldability.

Accordingly, the present invention has been made in an effort to solve the above-mentioned problems occurring in the prior arts, and it is an object of the present invention to provide a coated steel sheet having superior weldability, scratch-resistance, and corrosion-resistance properties, and a method of manufacturing the same.

SUMMARY OF THE INVENTION

To achieve the above object, the present invention provides a resin composition for an under coat of an UV coating layer comprising a main resin and a metal powder and satisfying a condition of the following formula 1.

$$Tb/3 \leq D1 \quad \text{[Formula 1]}$$

wherein D1 means an average particle size of a major axis of the metal powder, and Tb means a thickness of the under coat formed by the resin composition for the under coat of the UV coating layer.

In another aspect of the present invention, to achieve the above object, the present invention provides a coated steel sheet comprising: a material steel sheet; an under coat layer including a cured product of a resin composition for an under coat layer which contains a main resin and a metal powder and which satisfies a condition of the following formula 1, the under coat layer being formed on one side or both sides of the material steel sheet; and a top coat layer formed on the under coat layer and containing radical compound.

$$Tb/3 \leq D1 \quad \text{[Formula 1]}$$

wherein D1 means an average particle size of a major axis of the metal powder, and Tb means a thickness of the under coat layer formed by the cured product of the resin composition for the under coat layer.

A coated steel sheet according to the present invention includes an under coat layer formed on top of a material steel sheet, the under coat layer containing a metal powder having an average particle size of a major axis in a specific range; and a top coat layer containing a cured product of a UV-curing paint composition, the top coat layer being formed on top of the under coat layer, thereby achieving a superior appearance, scratch resistance, corrosion resistance, and weldability.

DESCRIPTION OF THE INVENTION

Figure 1:
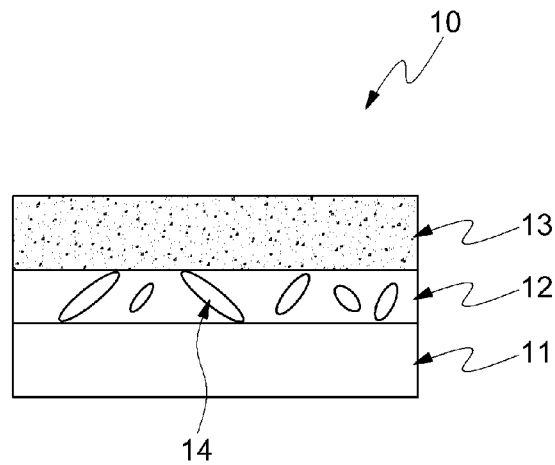
FIGS. 1 and 2 are sectional views of a coated steel sheet according to an embodiment of the present invention, wherein the steel sheet is coated on one side in FIG. 1 and coated on tow sides in FIG. 2.

The present invention relates to a resin composition for an under coat of an UV coating layer including a main resin and a metal powder, and satisfying a condition of the following formula 1.

$$Tb/3 \leq D1 \quad \text{[Formula 1]}$$

wherein D1 means an average particle size of a major axis of the metal powder, and Tb means a thickness of the under coat formed by the resin composition for the under coat of the UV coating layer.

Hereinafter, the resin composition for the under coat of the UV coating layer will be described in detail.

The resin composition for the under coat of the UV coating layer according to the present invention contains a main resin and a metal powder, and satisfies a condition of the formula 1. In other words, in consideration of thickness (Tb) of the under coat manufactured using the resin composition for the under coat of the UV coating layer according to the present invention, the average particle size (D1) of the major axis of the metal powder can be controlled to be more than Tb/3, preferably more than Tb/2, more preferably more than Tb.

In detail, for instance, in case of forming an under coat layer having thickness (Tb) of 1 μm to 10 μm on the material steel sheet using the resin composition for the under coat of the UV coating layer, in consideration of the thickness (Tb) of the under coat layer, the average particle size (D1) of the major axis of the metal powder which is contained in the resin composition for the under coat of the UV coating layer may be in a range of ⅓ μm to 10/3 r μm.

In the present invention, a method for measuring the average particle size of the major axis of the metal powder is not specially restricted, and may adopt any one of means which are generally used in the relevant field, for instance, may adopt a particle size analyzer.

In the resin composition for the under coat of the UV coating layer, if the average particle size (D1) of the major axis of the metal powder is less than Tb/3, when the coated steel sheet on which the resin composition for the under coat of the UV coating layer is coated is processed, powdering may be generated or weldability may be poor due to deterioration in conductivity of the under coat layer.

Moreover, the upper limit of the average particle size (D1) of the major axis of the metal powder is not specially limited, for instance, is less than 5 Tb, preferably less than 4 Tb, more preferably less than 3 Tb, and the most preferably less than 2 Tb. If the average particle size (D1) of the major axis of the metal powder exceeds 3 Tb, the metal powder may be removed from the under coat layer which is formed through curing of the resin composition for the under coat of the UV coating layer.

The resin composition for the under coat of the UV coating layer according to the present invention contains the main resin. The main resin serves to stably combine the metal powder and to construct the under coat layer for securing main properties such as corrosion resistance and processability.

In the resin composition for the under coat of the UV coating layer, kinds of the main resin are not specially limited, and any resin which can secure the main properties such as corrosion resistance and processability can be used. Preferably the main resin may be at least one selected from the group consisting of polyurethane resin, epoxy resin, phenoxy resin, ester resin, acrylic resin and olefin resin, more preferably polyurethane resin, the most preferably aqueous polyurethane resin. The aqueous polyurethane resin, for instance, may be a copolymer of diisocyanate, polyol and diamine, but the aqueous polyurethane resin is not restricted to the above. Detailed kinds of diisocyanate, polyol and diamine are not specially restricted, and may adopt any one of compounds which are generally used in the relevant field.

A 'volume part' which is the term used in the present invention means a volume ratio.

In the composition of the present invention, the main resin may be contained in a range of 20 volume parts to 90 volume parts, preferably 30 volume parts to 80 volume parts on the basis of 100 volume parts of a solid content of the resin composition for the under coat of the UV coating layer. If the main resin content is less than 20 volume parts, the metal powder cannot be stably dispersed and it is difficult to secure the main properties such as corrosion resistance and processability because the main resin content is too small. If the main resin content exceeds 90 volume parts, curing power may be deteriorated because the content of additives containing curing agent is too small.

The resin composition for the under coat of the UV coating layer may include the metal powder, and the metal powder serves to enhance conductivity of the under coat layer.

In the composition of the present invention, kinds of the metal powder are not specially restricted, and may adopt any one of metals which are generally used in the relevant field, but preferably may be at least one selected from the group consisting of Al, Ni, Co, Mn, Fe, Ti, Cu, Zn, Sn and $Fe_2P$ which have superior conductivity.

In the composition of the present invention, the metal powder may be contained in a range of 1 volume part to 30 volume parts, preferably 5 volume parts to 20 volume parts on the basis of 100 volume parts of the solid content of the resin composition for the under coat of the UV coating layer. If the metal powder content is less than 1 volume part, it is impossible to weld because sufficient electrical conductivity is not applied at the time of resistance welding in which very high currents must flow momentarily. If the metal powder content exceeds 30 volume parts, a coated film may be peeled at the time of processing the steel sheet, or the peeled metal powder may be fixed to a mold and hence an appearance of a molded product may be not good at the time of molding, and the peeled part or a scratched part may be easily corroded due to a rapid deterioration in corrosion resistance.

Furthermore, shapes of the metal powder are not specially restricted, but preferably the metal powder may be in a ball shape or a plate shape.

The resin composition for the under coat of the UV coating layer may additionally include an additive in a range of 1 volume part to 30 volume parts on the basis of 100 volume parts of the solid content of the resin composition for the under coat of the UV coating layer.

The additive which can be used in the resin composition for the under coat of the UV coating layer may be at least one selected from curing agent, storing stabilizer, silane coupling agent, filler and mixture thereof, but is not restricted to the above.

The curing agent serves to provide cohesiveness by crosslinking the main resin. Kinds of the curing agent may be at least one selected from the group consisting of amine-based compound, epoxy-based compound, melamine-based compound and blocked isocyanate-based compound, but is not restricted to the above.

The amine-based compound may be, for instance, tetra methylguanidine, imidazole or imidazole derivative, carboxylic acid hydrazide, tertiary amine, aromatic amine, aliphatic amine, dicyandiamide or dicyandiamide derivative, and so on. The epoxy-based compound may be, for instance, ethylene glycol diglycidyl ether, triglycidyl ether, trimethylolpropane triglycidyl ether, N,N,N',N'-tetraglycidyl ethylene diamine, or glycerine diglycidyl ether. The melamine-based compound may be, for instance, hexamethoxymethyl melamine, hexaethoxymethyl melamine, hexapropoxymethyl melamine, hexabutoxymethyl melamine, hexapentyloxymethyl melamine, hexahexyloxymethyl melamine or cymel 325 series (manufactured by Cytec Company). The blocked isocyanate-based compound may be, for instance, tolylene diisocyanate, xylene diisocyanate, diphenyl methane diisocyanate, hexamethylene diisocyanate, isophorone diisocyanate, tetramethyl xylene diisocyanate or naphthalene diisocyanate, which are blocked by blocking agents such as methylethyl keoxime, diethyl malonate or 3,5-dimethyl pyrazole, but is not restricted to the above.

The storing stabilizer can improve storability of the resin composition for the under coat of the UV coating layer according to the present invention. The storing stabilizer may be phenolic-based antioxidant or amine-based antioxidant, but is not restricted to the above.

The phenolic-based antioxidant may be, for instance, alkylated monophenol, alkylthiomethyl phenol, hydroquinone, alkylated hydroquinone, tocopherol, hydroxylated thiodiphenyl ether, alkylidene bisphenol, O-benzyl compound, N-benzyl compound, S-benzyl compound, hydroxyl benzylated malonate, aromatic hydroxybenzyl compound or triazine compound. The amine-based antioxidant may be, for example, aryl amine, diarylamine, polyarylamine, acyl aminophenol, oxamid, metal passivant, phosphite, phosphonite, benzyl phosphonate, ascorbic acid, hydroxyamine, nitron, thiosynergist, or indolinone, but is not restricted to the above.

The silane coupling agent may enhance adhesion between the main resin and the metal powder in the under coat layer formed by the resin composition of the under coat of the UV coating layer, or enhance adhesion between the steel sheet and the main resin.

The metal powder may be previously treated with the silane coupling agent and then the metal powder treated with the silane coupling agent may be mixed with the main resin, or the main resin may be previously mixed with the silane coupling agent and then the metal powder may be dispersed in the mixture.

In the case that the metal powder is dispersed in the mixture after the silane coupling agent is previously mixed with the main resin, the silane coupling agent may be contained in a range of 0.1 weight parts to 10 weight parts on the basis of 100 weight parts of the main resin. If the silane coupling agent content is less than 0.1 weight parts, adhesion between the metal powder and the main resin may be deteriorated due to a marginal addition effect. If the silane coupling agent content exceeds 10 weight parts, the silane coupling agent is irregularly dispersed in the resin composition for the under coat of the UV coating layer, corrosion resistance may be deteriorated.

The silane coupling agent may be, for instance, methacryloxypropyl trimethoxy silane, gamma-methacryloxypropyl ethoxy silane, gamma-chloropropyl methoxy silane, vinyl triethoxy silane, vinyl tris(Beta-methoxy ethoxy) silane, vinyl triacetoxy silane, gamma-glycidoxypropyl trimethoxy silane, gamma-glycidoxypropyl triethoxy silane, beta-(3,4-epoxy cyclohexyl) ethytrimethoxy silane, vinyl trichloro silane, gamma-mercaptopropyl methoxy silane, gamma-amino propyl triethoxy silane, N-beta-(amino ethyl)-gamma-amino propyl trimethoxy silane or mixture thereof, but is not restricted to the above.

The present invention relates to a coated steel sheet which includes: a material steel sheet; an under coat layer which includes a cured product of a resin composition for the under coat layer containing a main resin and a metal powder, and which satisfies a condition of the following formula 1, the under coat layer being formed on one side or both sides of the material steel sheet; and a top coat layer formed on the under coat layer and containing radical compound.

$$Tb/3 \leq D1 \quad \text{[Formula 1]}$$

wherein D1 means an average particle size of a major axis of the metal powder, and Tb means a thickness of the under coat layer formed by the cured product of the resin composition for the under coat layer.

Figure 2:
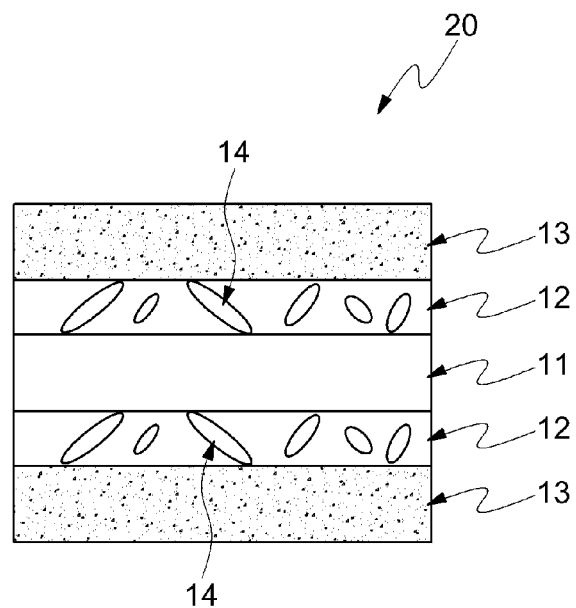

FIGS. 1 and 2 are sectional views of the coated steel sheet according to the present invention.

As shown in FIG. 1, the coated steel sheet 10 according to the present invention may include: a material steel sheet 11; an under coat layer 12 formed on one side of the material steel sheet 11 and containing metal powder 14; and a top coat layer 13 formed on the under coat layer 12. Alternatively, as shown in FIG. 2, the coated steel sheet 20 may include: a material steel sheet 11; two under coat layers 12 respectively formed on both sides of the material steel sheet 11 and containing metal powder 14; and two top coat layers 13 respectively formed on the under coat layers 12.

In the coated steel sheet of the present invention, kinds of the material steel sheet are not specially restricted, but preferably may be at least one selected from the group consisting of: a cold rolled steel sheet; a galvanized steel sheet; a zinc-based electroplated steel sheet; a galvannealed steel sheet; an aluminum coated steel sheet; a plated steel sheet containing cobalt, molybdenum, tungsten, nickel, titan, aluminum, manganese, iron, magnesium, tin, copper or mixture thereof in a plated layer; an aluminum alloy plate containing silicon, copper, magnesium, iron, manganese, titan, zinc or mixture thereof; a galvanized steel sheet coated with phosphate; and a hot rolled steel sheet, but are not restricted to the above.

Thickness of the steel sheet is not specially restricted, but may be properly selected according to purposes and uses of the used steel sheet. Steel sheets are divided into a thick plate exceeding 6 mm, a medium plate which is in a range of 1 mm to 6 mm, and a thin plate which is less than 1 mm according to their thicknesses. Such steel sheets are properly adopted according to applicable purposes of the present invention.

The under coat layer formed on one side or both sides of the steel sheet may include the cured product of the resin composition for the under coat of the UV coating layer which contains the main resin and metal powder and which satisfies the condition of the formula 1. The under coat layer contains the metal powder having the average particle size of the major axis satisfying the condition of the formula 1 so as to enhance conductivity of the under coat layer, thus providing superior weldability. Detailed description on the resin composition for forming the under coat layer is the same as the description on the resin composition for the under coat of the UV coating layer, and hence will be omitted.

The thickness of the under coat layer is not specially restricted, but preferably may be less than 10 μm, more preferably 1 μm to 10 μm, and more preferably 1 μm to 5 μm. If the thickness of the under coat layer exceeds 10 μm, even though the under coat layer contains the metal powder having conductibility, weldability becomes bad due to deterioration of conductivity. Moreover, when the top coat layer containing the cured product of the UV curing paint composition is additionally formed on the under coat layer, the weldability may not be revealed.

The top coat layer formed on the under coat layer may contain a radical compound, and preferably contain a cured product of a UV curing paint composition having an oligomer, a photo-polymerizable monomer, and a photo-initiator.

The UV curing paint composition can secure superior appearance, scratch-resistance and corrosion-resistance because containing the oligomer, the photo-polymerizable monomer and the photo-initiator.

A 'weight part' which is the term used in the present invention means a weight ratio.

In the UV curing paint composition, the oligomer may be contained in a range of 10 weight parts to 80 weight parts, preferably 30 weight parts to 70 weight parts on the basis of 100 weight parts of the UV curing paint composition. If the oligomer content is less than 10 weight parts, because photo-polymerization reaction becomes faster, brittleness of the coated film may be increased due to a high crosslink density. If the oligomer content exceeds 80 weight parts, because photo-polymerization reaction becomes slower, it is difficult to control crosslink density, and lots of UV irradiation volume for curing the coated film is required, or an UV irradiation period may be increased.

Moreover, kinds of the oligomer are not specially restricted, but preferably may be at least one acryl-based oligomer selected from the group consisting of urethane acrylate, epoxy acrylate and polyester acrylate.

Furthermore, in the UV curing paint composition according to the present invention, weight-average molecular weight of oligomer is not specially restricted, and for instance, may be in a range of 1000 to 5000, preferably 1000 to 3000.

In the present invention, the weight-average molecular weight means a conversion value of polystyrene measured by a GPC (Gel Permeation Chromatography).

In the UV curing paint composition, the photo-polymerizable monomer may be contained in a range of 10 weight parts to 80 weight parts, preferably 30 weight parts to 70 weight parts on the basis of 100 weight parts of the UV curing paint composition. If the photo-polymerizable monomer content is less than 10 weight parts, because photo-polymerization reaction becomes slower, it is difficult to control crosslink density, and lots of UV irradiation volume for curing the coated film is required, or an UV irradiation period may be increased. If the photo-polymerizable monomer content exceeds 80 weight parts, because photo-polymerization reaction becomes faster, brittleness of the coated film may be increased due to a high crosslink density.

Moreover, kinds of the photo-polymerizable monomer are not specially restricted, but preferably may be monofunctional or multifunctional acrylate-based monomer. The multifunctional acrylate-based monomer means photo-polymerizable acrylate-based monomer having at least two acrylate residues in a molecule.

Kinds of the monofunctional acrylate-based monomer are not specially restricted, and for instance, may be methyl (metha) acrylate, ethyl (metha) acrylate, n-propyl (metha) acrylate, isopropyl (metha) acrylate, n-butyl (metha) acrylate, t-butyl (metha) acrylate, sec-butyl (metha) acrylate, pentyl (metha) acrylate, 2-ethylhexyl (metha) acrylate, 2-ethylbutyl (metha) acrylate, n-octyl (metha) acrylate, isooctyl (metha) acrylate, isobonyl (metha) acrylate, isononyl (metha) acrylate, acryloylmorpholine (ACMO), tetrahydrofuryl (metha) acrylate, hydroxyethyl (metha) acrylate or hydroxypropyl (metha) acrylate, and may be one selected from the above or mixture of at least two selected from the above.

Furthermore, the multifunctional acrylate-based monomer may be, for instance, hexane diol di(metha)acrylate, trimethylolpropane trioxyethyl di(metha)acrylate, alkyleneglycol di(metha)acrylate, dialkyleneglycol di(metha)acrylate, trialkyleneglycol di(metha)acrylate, dicyclopentenyl di(metha)acrylate, dicyclopentenyl oxyethyl di(metha)acrylate, neopentylglycol di(metha)acrylate, dipentaerythritol-hexa di(metha)acrylate, trimethylolpropane tri(metha) acrylate, ethoxylated trimethylolpropane tri(metha) acrylate, propoxylated trimethylolpropane tri(metha) acrylate or pentaerythritol tri(metha) acrylate, and may be one selected from the above or mixture of at least two selected from the above.

In the UV curing paint composition, the photo-initiator may be contained in a range of 0.1 weight parts to 30 weight parts, preferably 1 weight part to 10 weight parts on the basis of 100 weight parts of the UV curing paint composition. If the photo-initiator content is less than 0.1 weight parts, because photo-polymerization reaction does not occur or occurs slowly, it is difficult to cure the coated film by UV irradiation or the curing period may be increased. If the photo-initiator content exceeds 30 weight parts, because the photo-initiator remains in a state where it is transferred into a radical form by photoreaction, it may restrain the photo-polymerization reaction or deteriorate the properties of the coated film.

Additionally, in the UV curing paint composition, kinds of the photo-initiator are not specially restricted, and may selectively adopt a short wavelength photo-initiator or long wavelength photo-initiator according to UV lamps used for curing the paint composition, but preferably may be at least one selected from the group consisting of benzophenone-based compound, benzoin-based compound, benzoin ether-based compound, benzyl ketal-based compound, acetophenone-based compound, antraquinone-based compound, and thioxanthone-based compound.

As examples of the photo-initiators which are commercially available in the market, there are Ciba specialty chemicals' products such as Irgacure 184™, Irgacure 754™, Irgacure 819™, Darocure 1173™, and Darocure TPO™, and Miwon company's products such as Micure CP-4™, Micure MP-8™, Micure BP™ and Micure TPO™, but kinds of the photo-initiators are not restricted to the above. In order to show properties of the solvent-free UV curing paint composition, in consideration of easiness in the manufacturing process, it is preferable that Irgacure 754™, Darocure 1173™ or Micure MP-8™ which are liquid-phase photo-initiators be used.

The additive may be contained in a range of 0.1 weight parts to 15 weight parts, preferably 0.3 weight parts to 10 weight parts, more preferably 0.5 weight parts to 6 weight parts on the basis of 100 weight parts of the UV curing paint composition.

In the UV curing paint composition, when the additive is contained within the above-mentioned content range, the additive can show its original effect without changing the properties required to the UV curing paint composition.

Kinds of the additives are not specially restricted, and may adopt any one of additives which are generally used in the relevant field, but preferably may be at least one selected from the group consisting of antifoaming agent, leveling agent, adhesion promoter, antioxidant, photostabilizer, UV absorber, thermal polymerization prohibitor, lubricating agent, dispersing agent, anti-static agent, plasticizer, organic filler and mixture thereof.

The antifoaming agent is to remove bubbles formed at the time of coating work on the under coat layer using the UV curing paint composition, and may be TEGO Airex 920, TEGO Airex 932, BYK 088 or BYK 1790, but is not restricted by the above.

The leveling agent is to enhance film appearance and scratch resistance, and may be TEGO Glide 410, TEGO Glide 440, TEGO Rad 2250, BYK-UV 3500 or BYK-UV 3510, but is not restricted by the above.

The adhesion promoter is to enhance adhesion to the under coat layer of the UV curing paint composition, and may be acryl phosphate-based adhesion promoter such as hydroxyethyl acryloyl phosphate or hydroxyethyl methacrylate phosphate, but is not restricted by the above.

The antioxidant may be, for instance, BASF company's products such as Irganox 1010, Irganox 1035, Irganox 1076 or Irganox 1222. The photostabilizer may be, for instance, BASF company's products such as Tinuvin 292, Tinuvin 144 or Tinuvin 622LD, and Sankyo company's products such as sanol LS-770, sanol LS-765, sanol LS-292 or sanol LS-744. The UV absorber may be BASF company's products such as Tinuvin P, Tinuvin 234, Tinuvin 320 or Tinuvin 328, or Sumitomo company's products such as Sumisorb 110, Sumisorb 130, Sumisorb 140, Sumisorb 220, Sumisorb 250, Sumisorb 320 or Sumisorbe 400, but is not restricted by the above.

For the lubricating agent and the dispersing agent, products manufactured by manufacturers which manufacture general paint additives such as the BYK company, the TEGO company and the EFKA company, may be selectively used.

In the coated steel sheet according to the present invention, thickness of the top coat layer is not specially restricted, but preferably may be 1 μm to 20 μm. If the thickness of the top coat layer is less than 1 μm, because the cured product of the UV curing paint composition is not sufficient, scratch-resistance and glossiness may be deteriorated. If the thickness of the top coat layer exceeds 20 μm, it is impossible to perform resistance welding under constant voltage due to a bad electric current or generation of spatters.

The coated steel sheet according to the present invention is useful as a construction material due to the superior appearance, scratch resistance, corrosion resistance, and weldability.

Moreover, the present invention relates to a method for manufacturing the coated steel sheet including the steps of: coating the resin composition for the under coat of the UV coating layer on one side or both sides of the steel sheet so as to form the under coat layer; and coating the UV curing paint composition, which contains the oligomer, the photo-polymerizable monomer and the photo-initiator, on top of the under coat so as to form a top coat layer.

In order to manufacture the coated steel sheet, first of all, a material steel sheet having a plating layer formed at one side or both sides thereof may be prepared or manufactured. In the case that the material steel sheet having the plating layer formed at one side or both sides thereof is manufactured, a metal with superior corrosion resistance may be plated on the material steel sheet. As described above, the metal usable for plating may be zinc, zinc-based alloy, aluminum or aluminum-based alloy, but is not restricted by the above.

The method for plating the metal on the steel sheet is not specially restricted, and may adopt any one of means which are generally used in the relevant field. For instance, electroplating which is easy to control a plating level and provides uniform plating level may be adopted, but the method is not restricted by the above.

In the method for manufacturing the coated steel sheet, detailed description of the material steel sheet is the same as the above.

As described above, in order to form the under coat layer on one side or both sides of the material steel sheet, the resin composition for the under coat of the UV coating layer may be coated on the surface of the material steel sheet.

As described above, the resin composition for the under coat of the UV coating layer may contain the main resin and the metal powder and satisfy the condition of the above-mentioned formula 1.

In detail, the resin composition for the under coat of the UV coating layer may be manufactured through the steps of adding the main resin in water which is a solvent, adding the metal powder and the additives, and properly ripening the mixture. The detailed description of the resin composition for the under coat of the UV coating layer is the same as the above, and hence will be omitted.

The resin composition for the under coat of the UV coating layer manufactured through the above steps may be coated on the material steel sheet so as to form the under coat layer, and such a coating method is not specially restricted, and may adopt any one of means which are generally used in the relevant field. For instance, the resin composition for the under coat can be coated on the material steel sheet using the roll coating, spraying or immersing method, and particularly may be coated by the roll coating which is applicable to one side or both sides of the steel sheet and is easy to control an adhesion level of the under coat layer, but the present invention is not restricted by the above.

In the step of forming the under coat layer, a drying process may be additionally carried out after the process of coating the resin composition for the under coat of the UV coating layer on the material steel sheet.

The drying process may be carried out at stoving temperature of 110° C. to 250° C., preferably 120° C. to 220° C. for five seconds or more. The stoving temperature means heating and drying temperature. If the stoving temperature, concretely, metal temperature is less than 110° C., because of a poor reaction between the main resin and the metal powder, some of the ingredients are removed when the steel sheet is washed, so that it is difficult to sufficiently secure corrosion resistance. If the metal temperature exceeds 250° C., the curing reaction is progressed no more, and hence just energy expenses by a heat loss may be increased.

In order to form the top coat layer on the under coat layer, the method for manufacturing the coated steel sheet according to the present invention may include the step of coating the UV curing paint composition on the under coat layer.

As described above, the UV curing paint composition contains the oligomer, the photo-polymerizable monomer and the photo-initiator. In detail, the UV curing paint composition may be manufactured by mixing the oligomer, the photo-polymerizable monomer and the photo-initiator together, and preferably manufactured by mixing the oligomer, the photo-polymerizable monomer, the photo-initiator and the additives. Kinds and content of the ingredients are the same as the above description, and hence will be omitted.

The top coat layer may be formed by coating the UV curing paint composition on the under coat layer, and such a coating method is not specially restricted by the above, and may adopt any one of means which are generally used in the relevant field. For instance, the UV curing paint composition can be coated on the under coat layer using the roll coating, spraying or immersing method, and particularly may be coated by the roll coating which is applicable to one side or both sides of the steel sheet and is easy to control an adhesion level of the top coat layer, but the present invention is not restricted by the above.

The step of forming the top coat layer may include the step of irradiating ultraviolet rays to cure the UV paint composition after the step of coating the UV curing paint composition on the under coat layer.

The curing process to form the top coat layer can be carried out by irradiating ultraviolet rays to the UV curing paint composition coated on the under coat layer, and the method for irradiating ultraviolet rays is not specially restricted, and may adopt any one of UV irradiating devices which are generally used in the relevant field. As the UV irradiating device, an UV lamp may be used, but the present invention is not restricted by the above.

The period of time to irradiate ultraviolet rays is not specially restricted, and can be properly selected in such a way as to sufficiently cure the UV curing paint composition.

As described above, when ultraviolet rays are irradiated to the UV curing paint composition coated on the under coat layer, the photo-initiator forms radicals and initiates reaction between the oligomer and the photo-polymerizable monomer so as to progress UV curing, so that the top coat layer containing the cured product of the UV curing paint composition may be formed on the under coat layer.

The coated steel sheet manufactured by the coated steel sheet manufacturing method according to the present invention can be useful as a construction material due to the superior appearance, scratch resistance, corrosion resistance and the superior weldability.

MODE FOR INVENTION

Hereinafter, the present invention will be described in more detail through examples of the present invention and comparative examples which do not follow the present invention, but the scope of the present invention is not limited by the following particular examples.

The resin composition for the under coat of the UV coating layer containing metal powder was coated on the material steel sheet, and then the UV curing paint composition was coated on the under coat layer containing the cured product of the resin composition for the under coat of the UV coating layer, thereby manufacturing the coated steel sheet. The constitution of the resin composition for the under coat of the UV coating layer was changed by changing the form, average particle size and content of the metal powder.

EXAMPLE 1

Preparation of Material Steel Sheet

As the material steel sheet, hot dip galvanized steel sheet whose zinc adhesion amount at one side was 60 g/m² was used.

Manufacture of Resin Composition for Under Coat of UV Coating Layer and Under Coat Treatment On the basis of 100 volume parts of the solid content of the resin composition for the under coat of the UV coating layer, 60 volume parts of water-soluble polyurethane resin which was copolymerized by diisocyanate, polyol and diamine and had a number average molecular weight of 3,000 to 10,000 and 15 volume parts of curing agent containing blocked polyisocyanate, amine-based curing agent, epoxy-based curing agent and melamine resin were diluted in water which was a solvent, and then 2 volume parts of a plate type aluminum metal powder whose an average particle size of a major axis was 6.3 μm and an average particle size of a minor axis was 0.4 μm was mixed to the mixture such that the resin composition for the under coat of the UV coating layer was manufactured. The ingredient was stirred at high speed using an impeller.

Continuously, the manufactured resin composition for the under coat of the UV coating layer was coated on the electroplated and galvanized steel sheet using a roll coater, and then was dried at metal temperature of 140° C., so that the under coat layer having thickness of 1 μm was formed.

Manufacture of UV Curing Paint Composition and Top Coat Treatment 35 g of modified epoxy acrylate oligomer [CN 150/80, Sartomer, U.S.A.], 15 g of urethane acrylate oligomer [UA-5221, HS Chemtron, Korea], 30 g of tetrahydrofurfuryl acrylate (THFA) [SR285, Sartomer, U.S.A.], 10 g of hexanedioldiacrylate (HDDA)[Miramer M200, Miwon company, Korea], 8 g of photo-initiator [Darocure 1173, Ciba Chemicals, Switzerland], 0.5 g of antifoaming agent [TEGO Airex 920, Evonik, Germany], 0.5 g of leveling agent [TEGO Rad 2250, Evonik, Germany], and 1 g of adhesion promoter were mixed together so as to manufacture the UV curing paint composition.

Next, the UV curing paint composition was coated on the under coat layer containing the metal powder using the roll coater, and then ultraviolet rays were irradiated with the intensity of radiation of 2,000 mJ/cm² using the UV lamp so as to cure the UV curing paint composition such that the top coat layer with thickness of 6 μm was formed.

EXAMPLES 2 to 40

Except that kinds, forms, average particle size and content of the metal powder, and thicknesses of the under coat layer and the top coat layer were changed as indicated in the following Table 1, the examples 2 to 40 were carried out in the same way as the example 1 in order to manufacture the coated steel sheet.

TABLE 1

| Div. | | Kind | Form | Metal powder Average particle size of major axis | Average particle size of minor axis | Content | Thickness of under coat layer | Thickness of top coat layer |
|---|---|---|---|---|---|---|---|---|
| Example | 1 | Al | Plate type | 6.3 | 0.4 | 2.0 | 1 | 6 |
|  | 2 |  |  |  |  |  | 5 | 6 |
|  | 3 |  |  |  |  |  | 8 | 6 |
|  | 4 |  |  |  |  |  | 5 | 12 |
|  | 5 |  |  |  |  | 8.0 | 1 | 6 |
|  | 6 |  |  |  |  |  | 5 | 6 |
|  | 7 |  |  |  |  |  | 8 | 6 |
|  | 8 |  |  |  |  |  | 5 | 12 |
|  | 9 |  |  |  |  | 15.0 | 1 | 6 |
|  | 10 |  |  |  |  |  | 5 | 6 |
|  | 11 |  |  |  |  |  | 8 | 6 |
|  | 12 |  |  |  |  |  | 5 | 12 |
|  | 13 |  |  |  |  | 30.0 | 1 | 6 |
|  | 14 |  |  |  |  |  | 5 | 6 |
|  | 15 |  |  |  |  |  | 8 | 6 |
|  | 16 |  |  |  |  |  | 5 | 12 |
|  | 17 |  | Ball shape | 5.7 | 5.7 | 10.0 | 2 | 3 |
|  | 18 |  |  |  |  |  | 2 | 6 |

TABLE 1-continued

| Div. | Metal powder Kind | Form | Average particle size of major axis | Average particle size of minor axis | Content | Thickness of under coat layer | Thickness of top coat layer |
|---|---|---|---|---|---|---|---|
| 19 | | | | | | 2 | 12 |
| 20 | | | | | | 4 | 3 |
| 21 | | | | | | 4 | 6 |
| 22 | | | | | | 4 | 12 |
| 23 | | | | | | 8 | 3 |
| 24 | | | | | | 8 | 6 |
| 25 | | | | | | 8 | 12 |
| 26 | Zn | Ball shape | 4.6 | 4.6 | 2.0 | 5 | 6 |
| 27 | | | | | 5.0 | | |
| 28 | | | | | 10.0 | | |
| 29 | | | | | 15.0 | | |
| 30 | | | | | 30.0 | | |
| 31 | Ni | Ball shape | 3.2 | 3.2 | 2.0 | 5 | 6 |
| 32 | | | | | 5.0 | | |
| 33 | | | | | 10.0 | | |
| 34 | | | | | 15.0 | | |
| 35 | | | | | 30.0 | | |
| 36 | | Plate type | 8.7 | 0.8 | 2.0 | 5 | 6 |
| 37 | | | | | 5.0 | | |
| 38 | | | | | 10.0 | | |
| 39 | | | | | 15.0 | | |
| 40 | | | | | 30.0 | | |

Unit of average size and thickness: μm,
Content unit: volume part

COMPARATIVE EXAMPLES 1 to 26

Except that kinds, forms, average particle size, and content of the metal powder and thicknesses of the under coat layer and the top coat layer were changed as indicated in the following Table 2, the comparative examples 1 to 26 were carried out in the same way as the example 1 in order to manufacture the coated steel sheet.

TABLE 2

| Div. | | Metal powder Kind | Form | Average particle size of major axis | Average particle size of minor axis | Content | Thickness of under coat layer | Thickness of top coat layer |
|---|---|---|---|---|---|---|---|---|
| Comparative Example | 1 | Al | Plate type | 6.3 | 0.4 | 0.5 | 1 | 6 |
| | 2 | | | | | | 5 | 6 |
| | 3 | | | | | | 8 | 6 |
| | 4 | | | | | | 12 | 6 |
| | 5 | | | | | | 5 | 12 |
| | 6 | | | | | | 5 | 25 |
| | 7 | | | | | 2.0 | 12 | 6 |
| | 8 | | | | | | 5 | 25 |
| | 9 | | | | | 8.0 | 12 | 6 |
| | 10 | | | | | | 5 | 25 |
| | 11 | | | | | 15.0 | 12 | 6 |
| | 12 | | | | | | 5 | 25 |
| | 13 | | | | | 30.0 | 12 | 6 |
| | 14 | | | | | | 5 | 25 |
| | 15 | | Ball shape | 5.7 | 5.7 | 10.0 | 2 | 25 |
| | 16 | | | | | | 4 | 25 |
| | 17 | | | | | | 8 | 25 |
| | 18 | Zn | Ball shape | 1.2 | 1.2 | 0.5 | 5 | 6 |
| | 19 | | | | | 2.0 | | |
| | 20 | | | | | 5.0 | | |
| | 21 | | | | | 10.0 | | |
| | 22 | | | | | 15.0 | | |
| | 23 | | | | | 30.0 | | |
| | 24 | | | 4.6 | 4.6 | 0.5 | 5 | 6 |
| | 25 | Ni | Ball shape | 3.2 | 3.2 | 0.5 | 5 | 6 |
| | 26 | | Plate type | 8.7 | 0.8 | 0.5 | 5 | 6 |

Unit of average size and thickness: μm,
Content unit: volume part

In order to evaluate the qualities of the coated steel sheets manufactured by the examples and the comparative examples, properties of weldability, corrosion resistance and scratch resistance were evaluated, and the properties were measured by the following methods.

1. Weldability

Electrode lives of the coated steel sheets manufactured by the examples and the comparative examples were measured using an AC pneumatic spot welding machine which had welding electrode of Copper-Chrome alloy RWMA class II. The measurement of the electrode life was carried out under measurement conditions of 1.8 kN in welding force, 6 cycles in welding time, 24 cycles in squeezing time, and 12 cycles in maintenance period of time, and welding current and applied voltage were properly controlled after a current range capable of welding was measured. As the electrode life, a maximum welding spotting number that an average diameter of a welding part nugget was four times more than square root of the steel sheet thickness, namely, four times more than (the steel sheet thickness)$^{1/2}$ was measured. Valuation standards of weldability are as follows.

<Valuation Standards of Weldability>

◎ when continuous welding spotting number is more than 800

○: when continuous welding spotting number is from 600 to 800

Δ: when continuous welding spotting number is from 300 to 500 x: when continuous welding spotting number is from 0 to 300

2. Corrosion Resistance

The coated steel sheets manufactured by the examples and the comparative examples were processed into cup-shaped specimens. Salt water having salt concentration of 5% and temperature of 35° C. was uniformly sprayed to the specimens at injection pressure of 1 kg/cm² using a salt spray tester (SST), and then, time that red rust was generated on the side surface of the cup-shaped specimens was measured. Valuation stands of corrosion resistance are as follows.

<Valuation Standards of Corrosion Resistance>

◎ when red rust generation time is more than 480 hours

○: when red rust generation time is from 360 hours to 480 hours

Δ: when red rust generation time is from 240 hours to 360 hours x: when red rust generation time is less than 240

3. Scratch Resistance

Scratch resistance was measured using pencil hardness according to JIS K5600-5-4KS. The pencil hardness is divided into 9B to 9H, and hardness becomes weakened toward 9B but stronger toward 9H.

<Valuation Standards of Scratch Resistance>

◎ more than HB

○: from B to F

Δ: from 4B to 2B x: less than 5B

Table 3 shows measurement results of properties of the coated steel sheets according to the examples 1 to 40.

TABLE 3

| Div. | | Weldability | Corrosion resistance | Scratch resistance |
|---|---|---|---|---|
| Example | 1 | ○ | ◎ | ◎ |
| | 2 | ○ | ◎ | ◎ |
| | 3 | ○ | ◎ | ◎ |
| | 4 | ○ | ◎ | ◎ |

TABLE 3-continued

| Div. | Weldability | Corrosion resistance | Scratch resistance |
|---|---|---|---|
| 5 | ○ | ◎ | ◎ |
| 6 | ○ | ◎ | ◎ |
| 7 | ○ | ◎ | ◎ |
| 8 | ○ | ◎ | ◎ |
| 9 | ○ | ◎ | ◎ |
| 10 | ○ | ◎ | ◎ |
| 11 | ○ | ◎ | ◎ |
| 12 | ○ | ◎ | ◎ |
| 13 | ○ | ○ | ◎ |
| 14 | ○ | ○ | ◎ |
| 15 | ○ | ○ | ◎ |
| 16 | ○ | ○ | ◎ |
| 17 | ○ | ◎ | ○ |
| 18 | ○ | ◎ | ◎ |
| 19 | ○ | ◎ | ◎ |
| 20 | ○ | ◎ | ○ |
| 21 | ○ | ◎ | ◎ |
| 22 | ○ | ◎ | ◎ |
| 23 | ○ | ◎ | ○ |
| 24 | ○ | ◎ | ◎ |
| 25 | ○ | ◎ | ◎ |
| 26 | ○ | ◎ | ◎ |
| 27 | ○ | ◎ | ◎ |
| 28 | ○ | ◎ | ◎ |
| 29 | ○ | ○ | ◎ |
| 30 | ○ | ◎ | ◎ |
| 31 | ○ | ◎ | ◎ |
| 32 | ○ | ◎ | ◎ |
| 33 | ○ | ◎ | ◎ |
| 34 | ○ | ○ | ◎ |
| 35 | ○ | ◎ | ◎ |
| 36 | ○ | ◎ | ◎ |
| 37 | ○ | ◎ | ◎ |
| 38 | ○ | ◎ | ◎ |
| 39 | ○ | ◎ | ◎ |
| 40 | ○ | ○ | ◎ |

◎: Excellent/○: Good

Table 4 shows measurement results of properties of the coated steel sheets according to the comparative examples 1 to 26.

TABLE 4

| Div. | | Weldability | Corrosion resistance | Scratch resistance |
|---|---|---|---|---|
| Comparative example | 1 | X | ◎ | ◎ |
| | 2 | X | ◎ | ◎ |
| | 3 | X | ◎ | ◎ |
| | 4 | X | ◎ | ◎ |
| | 5 | X | ◎ | ◎ |
| | 6 | X | ◎ | ◎ |
| | 7 | Δ | ◎ | ◎ |
| | 8 | X | ◎ | ◎ |
| | 9 | X | ◎ | ◎ |
| | 10 | X | ◎ | ◎ |
| | 11 | X | ◎ | ◎ |
| | 12 | X | ◎ | ◎ |
| | 13 | X | ○ | ◎ |
| | 14 | X | ○ | ◎ |
| | 15 | X | ◎ | ◎ |
| | 16 | X | ◎ | ◎ |
| | 17 | X | ◎ | ◎ |
| | 18 | X | ◎ | ◎ |
| | 19 | X | ◎ | ◎ |
| | 20 | X | ◎ | ◎ |
| | 21 | X | ◎ | ◎ |
| | 22 | X | ◎ | ◎ |
| | 23 | X | ○ | ◎ |
| | 24 | X | ◎ | ◎ |
| | 25 | X | ◎ | ◎ |
| | 26 | X | ◎ | ◎ |

◎: Excellent/○: Good/Δ: normal/X: bad

As shown in the Tables 1 and 2, in case of the examples 1 to 40 according to the present invention, they satisfied the Formula 1, the content of the metal powder contained in the resin composition of the UV coating layer was in a range of 1 volume part to 30 volume parts, thickness (Tb) of the under coat layer was less than 10 μm, and thickness (Tt) of the top coat layer was less than 20 μm. Therefore, the examples 1 to 40 according to the present invention showed superior weldability, corrosion resistance and scratch resistance of the coated steel sheets.

On the contrary, in case of the comparative examples 1 to 6 and 24 to 26, the content of the metal power was 0.5 volume parts. Therefore, the comparative examples 1 to 6 and 24 to 26 were bad in weldability because the metal powder content was out of the specific content range of the present invention.

In case of the comparative examples 7, 9, 11 and 13, thickness of the under coat layer of the coated steel sheet exceeded 10 μm, and hence weldability was normal or bad.

In case of the comparative examples 8, 10, 12 and 14 to 17, thickness of the top coat layer of the coated steel sheet exceeded 20 μm, and hence weldability was bad.

In case of the comparative examples 18 to 23, the average particle size (D1) of the major axis of the metal powder was smaller than Tb/3, and hence weldability was bad.

In other words, the coated steel sheet according to the present invention can control thickness of the under coat layer, thickness of the top coat layer, and the content of the metal powder contained in the resin composition for the under coat of the UV coating layer within the specific ranges and satisfies the condition of the formula 1, thereby providing superior weldability, corrosion resistance and scratch resistance.

EXPLANATION OF ESSENTIAL REFERENCE NUMERALS IN DRAWINGS

- 10, 20: coated steel sheet
- 11: material steel sheet
- 12: under coat layer
- 13: top coat layer
- 14: metal powder As described above, the coated steel sheet according to the present invention can be useful as the construction material due to the superior appearance, scratch resistance, corrosion resistance, and the superior weldability.

The invention claimed is:

1. A coated steel sheet comprising:
   a material steel sheet;
   an under coat layer including a cured product of a resin composition for the under coat layer which contains a main resin and a metal powder and which satisfies a condition of the following formula 1, the under coat layer being formed on one side or both sides of the material steel sheet; and
   a top coat layer formed on the under coat layer and containing a radical compound:

$Tb/3 \leq D1$     [Formula 1]

wherein D1 means an average particle size of a major axis of the metal powder, and Tb means a thickness of the under coat layer formed by the cured product of the resin composition for the under coat layer,
   wherein the main resin is contained in a range of 20 volume parts to 90 volume parts on the basis of 100 volume parts of a solid content of the resin composition for the under coat layer,
   wherein the metal powder is contained in a range of 1 volume part to 30 volume parts on the basis of 100 volume parts of a solid content of the resin composition for the under coat layer,
   wherein the thickness of the under coat layer is 1 μm to 10 μm,
   wherein the top coat layer comprises a cured product of a UV curing paint composition containing an oligomer, a photo-polymerizable monomer, and a photo-initiator,
   wherein the UV curing paint composition contains 30 weight parts to 70 weight parts of the oligomer, 30 weight parts to 70 weight parts of the photo-polymerizable monomer, and 0.1 weight parts to 30 weight parts of the photo-initiator on the basis of 100 weight parts of the UV curing paint composition, and
   wherein a thickness of the top coat layer is 1 μm to 20 μm.

2. The coated steel sheet according to claim 1, wherein the main resin is at least one selected from the group consisting of polyurethane resin, epoxy resin, phenoxy resin, ester resin, acrylic resin and olefin resin.

3. The coated steel sheet according to claim 1, wherein the oligomer is at least one selected from the group consisting of urethane acrylate, epoxy acrylate and polyester acrylate.

4. The coated steel sheet according to claim 1, wherein the photo-polymerizable monomer is monofunctional or multifunctional acrylate-based monomer.

5. The coated steel sheet according to claim 1, wherein the photo-initiator is at least one selected from the group consisting of benzophenone-based compound, benzoin-based compound, benzoinether-based compound, benzyl ketal-based compound, acetophenone-based compound, antraquinone-based compound and thioxanthone-based compound.

6. The coated steel sheet according to claim 1, wherein the UV curing paint composition further comprises 0.1 weight parts to 15 weight parts of an additive on the basis of 100 weight parts of the UV curing paint composition.

7. The coated steel sheet according to claim 6, wherein the additive is at least one selected from the group consisting of antifoaming agent, leveling agent, adhesion promoter, antioxidant, photostabilizer, UV absorber, thermal polymerization prohibitor, lubricating agent, dispersing agent, antistatic agent, plasticizer, organic filler and mixture thereof.

8. The coated steel sheet according to claim 1, wherein the coated steel sheet is used as a construction material.

* * * * *

UNITED STATES PATENT AND TRADEMARK OFFICE
CERTIFICATE OF CORRECTION

PATENT NO.      : 9,534,143 B2
APPLICATION NO. : 14/353948
DATED           : January 3, 2017
INVENTOR(S)     : Hye Jin Yoo et al.

Page 1 of 1

It is certified that error appears in the above-identified patent and that said Letters Patent is hereby corrected as shown below:

In the Claims

Column 17, Line 58, Claim 1, after "D1" insert -- ≤3Tb --

Signed and Sealed this
Fourteenth Day of March, 2017

Michelle K. Lee
*Director of the United States Patent and Trademark Office*